(12) United States Patent
Park

(10) Patent No.: US 11,855,508 B1
(45) Date of Patent: Dec. 26, 2023

(54) WATERPROOF MOTOR

(71) Applicant: Dukshin Corp., Ltd., Incheon (KR)

(72) Inventor: Chanil Park, Gwangmyeong-si (KR)

(73) Assignee: DUKSHIN CORP., LTD., Incheon (KR)

( * ) Notice: Subject to any disclaimer, the term of this patent is extended or adjusted under 35 U.S.C. 154(b) by 0 days.

(21) Appl. No.: 18/217,284

(22) Filed: Jun. 30, 2023

(30) Foreign Application Priority Data

Jan. 6, 2023 (KR) .......................... 10-2023-0002374

(51) Int. Cl.
*H02K 5/10* (2006.01)
*H02K 5/16* (2006.01)

(52) U.S. Cl.
CPC .................. *H02K 5/10* (2013.01); *H02K 5/16* (2013.01)

(58) Field of Classification Search
CPC ............ H02K 5/10; H02K 5/16; H02K 5/161; H02K 5/163; H02K 5/165
USPC ..................................................... 310/90, 88
See application file for complete search history.

(56) References Cited

FOREIGN PATENT DOCUMENTS

| KR | 20110087689 | A  | 8/2011  |
| KR | 20150041520 | A  | 4/2015  |
| KR | 20160109508 | A  | 9/2016  |
| KR | 102310927   | B1 | 10/2021 |
| KR | 20220130462 | A  | 9/2022  |
| KR | 2533032     | B1 | 5/2023  |

*Primary Examiner* — Terrance L Kenerly
(74) *Attorney, Agent, or Firm* — KIRTON McCONKIE; Evan R. Witt

(57) ABSTRACT

Provided is a waterproof motor for preventing external liquid from entering a housing thereof. The waterproof motor includes a housing, a motor shaft, a bearing, a motor packing, and a motor shaft O-ring provided between the motor packing and the bearing, wherein the motor shaft O-ring has a through hole formed in the center of a body part so that the motor shaft is inserted thereinto, projection parts are formed on the inner wall surface of the through hole toward the center of the through hole so as to be elastically deformed while outer surfaces of the projection parts come into contact with the outer surface of the motor shaft, and a storage groove is formed between the projection parts and stores lubricating oil such as grease.

2 Claims, 5 Drawing Sheets

WATERPROOF MOTOR

BACKGROUND OF THE INVENTION

Technical Field

The present disclosure relates to a waterproof motor and, more particularly, to a waterproof motor for preventing external liquid from entering a housing thereof.

Background

In general, a waterproof motor includes a housing having a passing hole formed through the housing and a motor shaft mounted through the passing hole formed in the housing.

A bearing containing lubricating oil such as grease is installed between the inner surface of the passing hole and the outer surface of the motor shaft, so that when driving force is transmitted to the motor shaft from a motor, the motor shaft rotates smoothly and at the same time inflow of liquid into the housing is suppressed by the viscosity of the lubricating oil such as grease.

However, such a conventional waterproof motor has problems in that when the motor is used while the motor itself is immersed in a fluid, the fluid flows into the housing due to hydraulic pressure and troubles such as short circuits or corrosion occur, resulting in motor failure or malfunction.

Therefore, in order to solve the above problems in the prior art, as shown in FIG. 1, a motor packing 400' having an insertion hole 410', which is formed in the center of the motor packing 400' and has contact protrusions 411' formed protruding toward the center of the insertion hole 410' from the inner wall surface of the insertion hole 410' at uniform intervals, is installed on an outer surface of a housing 100', which has a passing hole 110' formed through the housing 100', so that the outer surface of the motor shaft 200' inserted through the insertion hole 410' comes into close contact with the contact protrusions 411', preventing liquid from flowing into the housing 100'.

However, this waterproof motor still has the problem that liquid flows into the housing 100' due to the generation of a minute space between the motor shaft 200' and the contact protrusions 411' due to long-term use of the motor.

PRIOR ART DOCUMENT

Patent Document

[Patent Document 1]
Korean Patent Pub. No. 10-2022-0124985 (published: Sep. 14, 2022)

SUMMARY OF THE INVENTION

The present disclosure was derived to solve the above conventional problems, and it is an object of the present disclosure to provide a waterproof motor, in which when driving force is transmitted to a motor shaft from a motor, the motor shaft rotates smoothly by lubricating action of lubricating oil such as grease and, at the same time, a motor shaft O-ring prevents liquid from entering a housing.

In order to achieve the object of the present invention, a water proof motor according to the present disclosure includes a housing having a passing hole formed through the housing, a motor shaft mounted through the passing hole formed in the housing, a bearing provided between an outer surface of the motor shaft and an inner wall surface of the passing hole in a state in which lubricating oil such as grease is contained, a motor packing having an insertion hole, which is formed in a center portion of the motor packing and has contact protrusions, which are formed protruding inward at uniform intervals so as to come into contact with the outer surface of the motor shaft that rotates while being supported by the bearing, and a motor shaft O-ring provided between the motor packing and the bearing, wherein the motor shaft O-ring has a through hole, which is formed through a central portion of a body part and into which the motor shaft is inserted, projection parts are formed protruding from upper and lower portions of an inner wall surface of the through hole toward the center of the through hole so as to be elastically deformed while outer surfaces of the projection parts come into contact with the outer surface of the motor shaft, and a storage groove for storing lubricating oil such as grease is formed between the projection parts.

Meanwhile, the motor shaft O-ring has an outer diameter of the body part in the range of 4.9 to 5.1 mm and a height L of 1.5 mm, the storage groove formed on the inner wall surface of the through hole in the center portion of the body part has a depth l of 0.4 mm, and the projection parts formed on the inner wall surface of the through hole have an inner diameter Q2 of 1.9 mm. The motor shaft O-ring is inserted so that the outer surface of the body part comes into close contact with the inner wall surface of the passing hole formed in the housing. In addition, when the motor shaft is inserted into the body part, passing through the through hole formed in the body part, the outer surfaces of the projection parts formed on the upper and lower portions of the inner wall surface of the through hole are elastically deformed and come into close contact with the outer surface of the motor shaft.

According to the present disclosure, when the motor shaft rotates, waterproofing is primarily achieved by the contact protrusions of the motor packing, which come into contact with the outer surface of the motor shaft. In addition, when a space is generated between the motor shaft and the contact protrusions and liquid flows in, sequential waterproofing is achieved by contact between the outer surface of the motor shaft and the projection parts formed on the inner wall surface of the through hole of the motor shaft O-ring and, at the same time, the viscosity of lubricating oil such as grease stored in the storage groove formed on the inner wall surface of the through hole. Finally, inflow of liquid into the housing is prevented by the bearing containing lubricating oil such as grease and installed between the inner wall surface of the passing hole and the outer surface of the motor shaft. Therefore, the present disclosure is very useful for effects such as improving durability of the motor and preventing electrical problems or malfunctions due to inflow of fluid.

DESCRIPTION OF THE INVENTION

Hereinafter, the technical features of the present disclosure will be described in detail with reference to the accompanying drawings.

Figure 1:
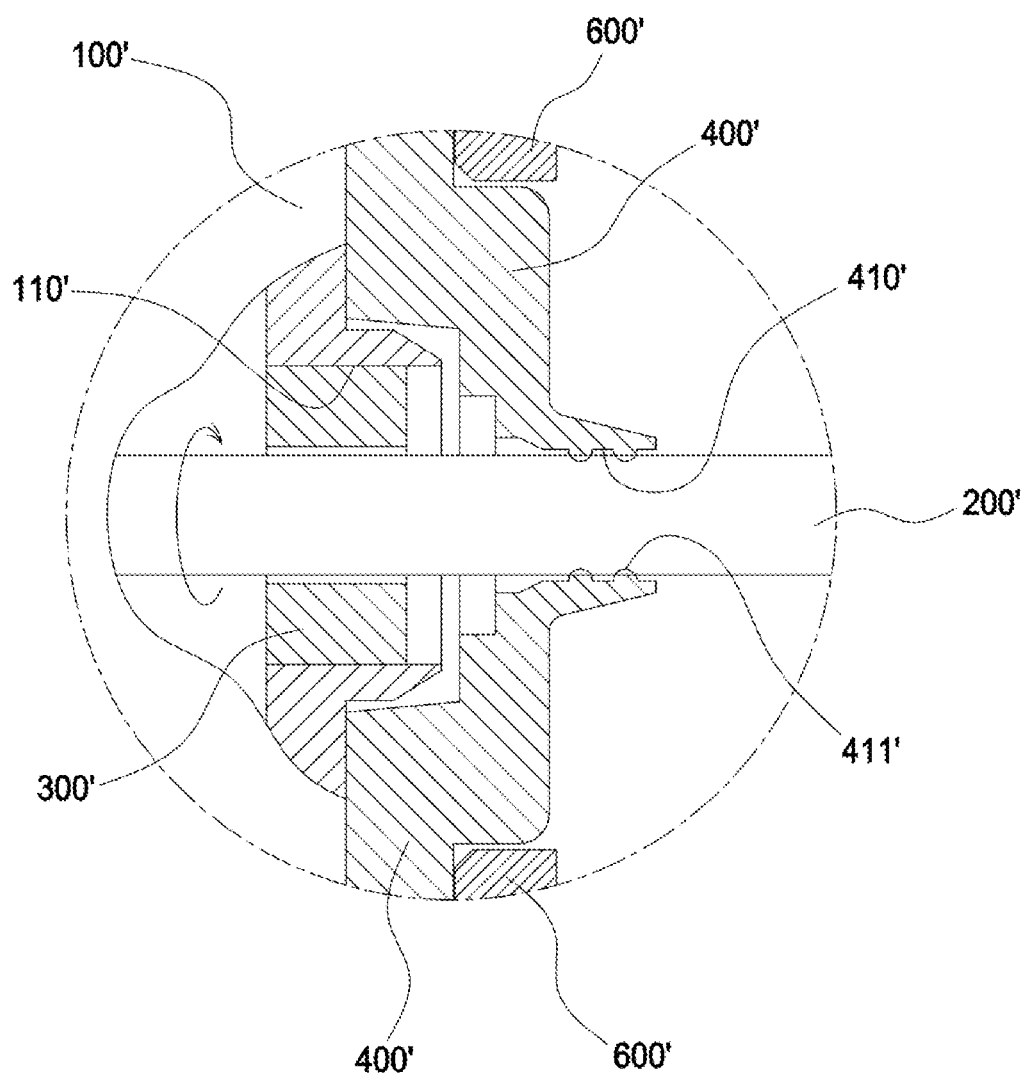
FIG. 1 is a cross-sectional view showing the structure of a conventional waterproof motor.
Figure 2:
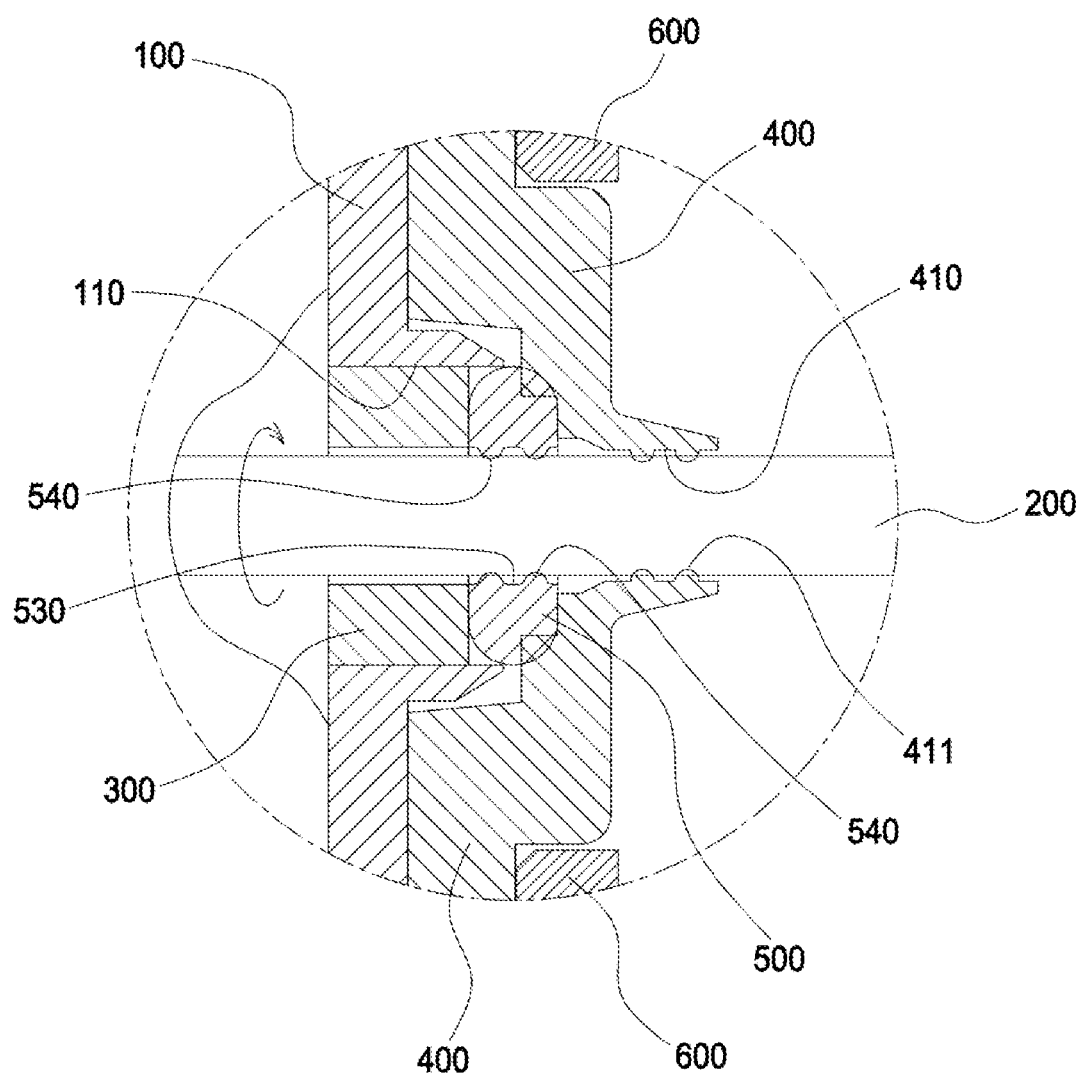
FIG. 2 is a cross-sectional view showing the structure of a waterproof motor according to the present disclosure.
Figure 3:
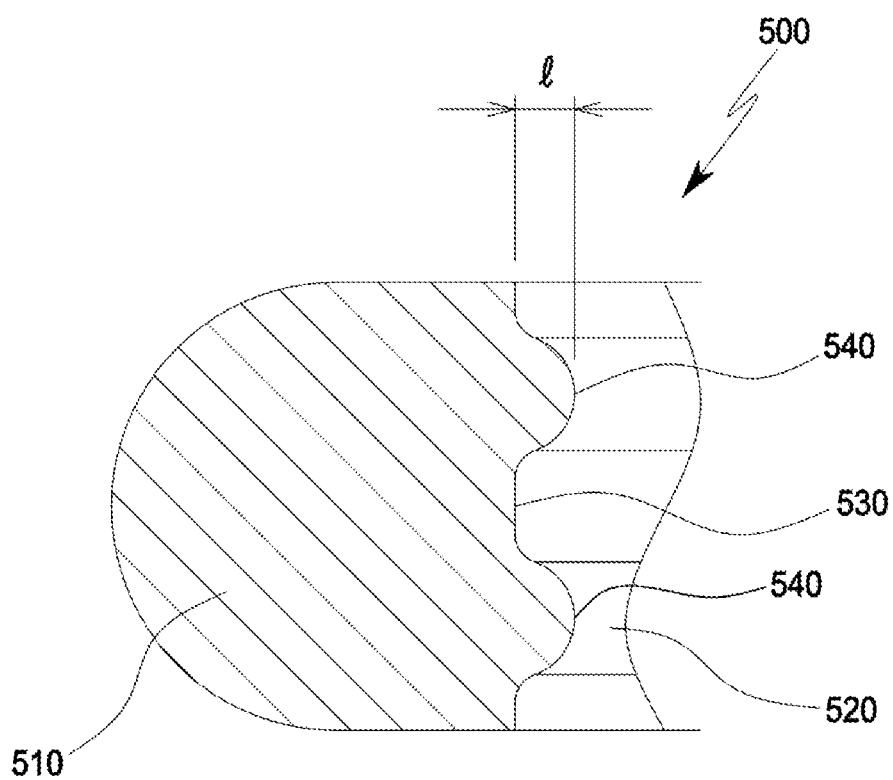
FIG. 3 is an enlarged cross-sectional view showing a motor shaft O-ring for the waterproof motor according to the present disclosure.
Figure 4A:
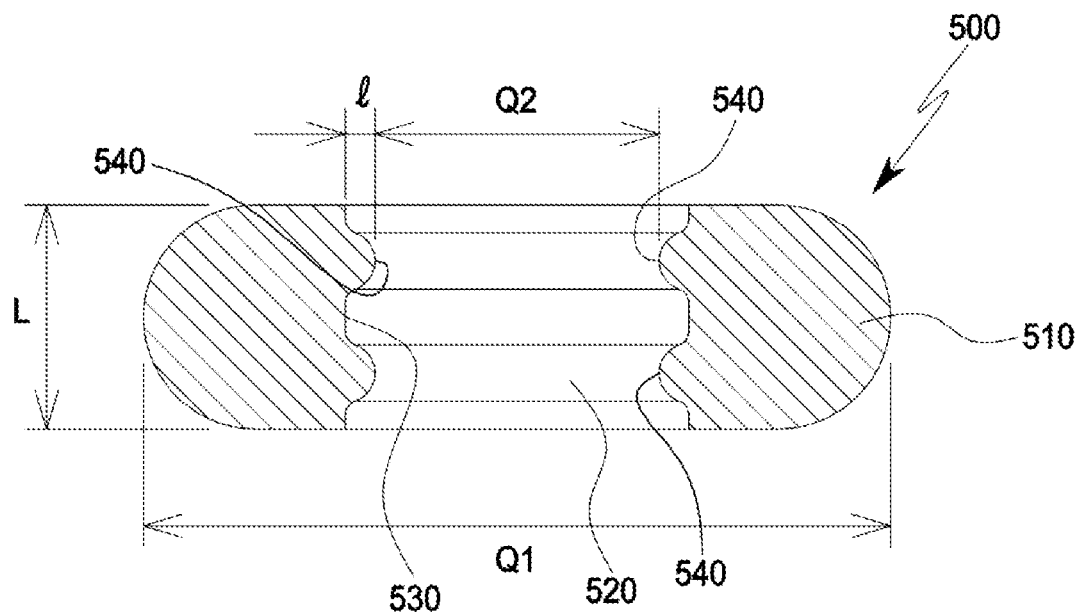
FIG. 4A is a cross-sectional view showing the motor shaft O-ring for the waterproof motor according to the present disclosure.
Figure 4B:
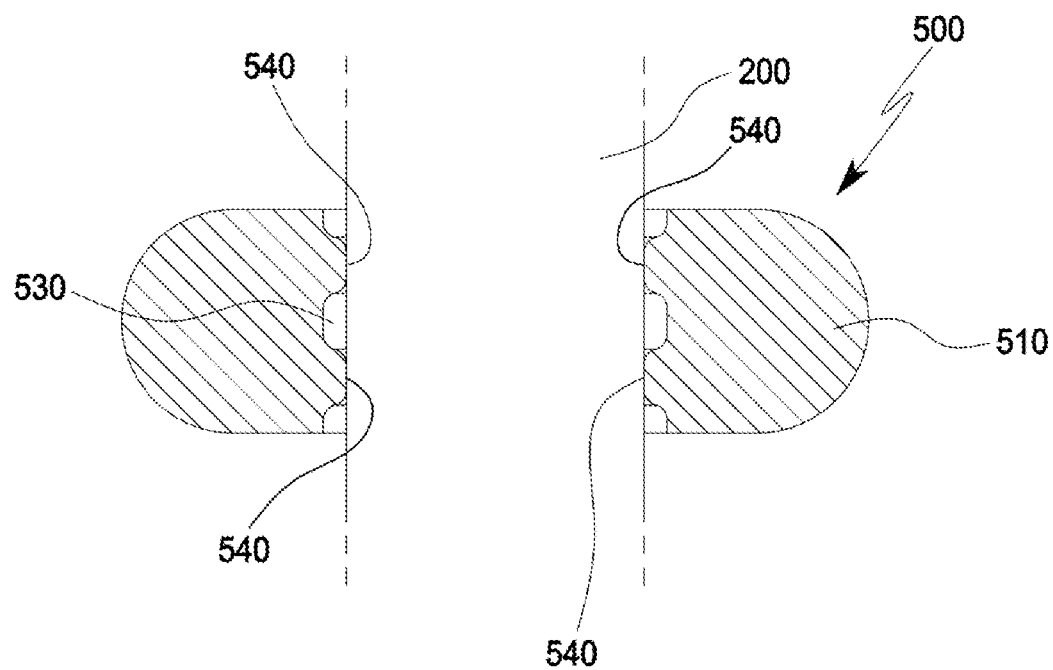
FIG. 4B is a cross-sectional view showing a state in which a motor shaft is inserted into a through hole of the motor shaft O-ring for the waterproof motor according to the present disclosure.
Figure 5:
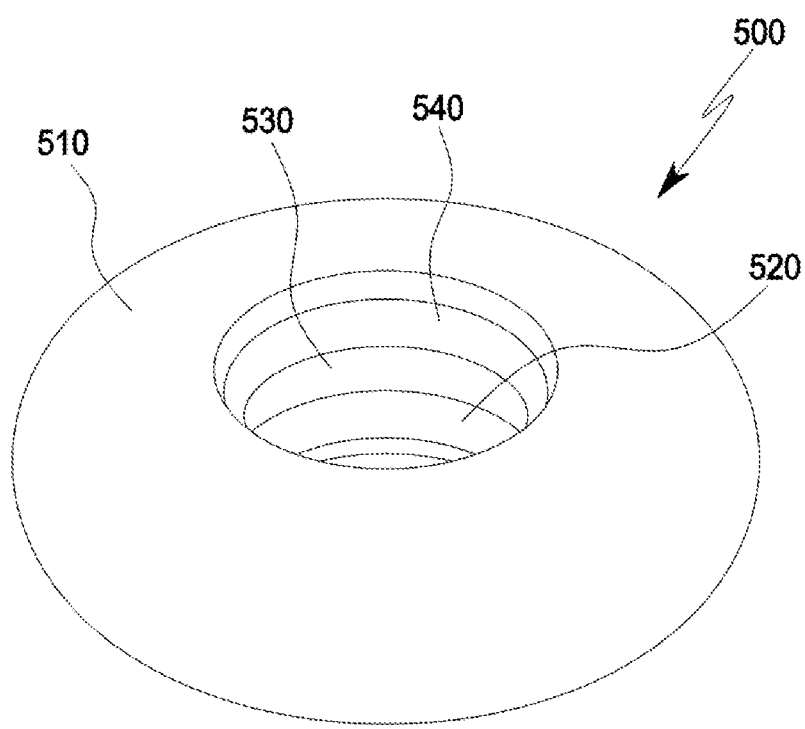
FIG. 5 is a perspective view showing the motor shaft O-ring for the waterproof motor according to the present disclosure.

FIG. 2 is a cross-sectional view showing the structure of a waterproof motor according to the present disclosure, FIG. 3 is an enlarged cross-sectional view showing a motor shaft O-ring for the waterproof motor according to the present disclosure, FIG. 4A is a cross-sectional view showing the motor shaft O-ring for the waterproof motor according to the present disclosure, FIG. 4B is a cross-sectional view showing a state in which a motor shaft is inserted into a through hole of the motor shaft O-ring for the waterproof motor according to the present disclosure, and FIG. 5 is a perspective view showing the motor shaft O-ring for the waterproof motor according to the present disclosure.

As shown in FIG. 2 to FIG. 5, a waterproof motor according to the present disclosure includes a housing 100 having a passing hole 110 formed through the housing 100, a motor shaft 200 mounted through the passing hole 110 formed in the housing 100, a bearing 300 provided between an outer surface of the motor shaft 200 and an inner wall surface of the passing hole 110 in a state in which lubricating oil such as grease is contained, a motor packing 400 having an insertion hole 410, which is formed in a center portion of the motor packing 400 and has contact protrusions 411, which are formed protruding inward at uniform intervals so as to come into contact with the outer surface of the motor shaft 200 that rotates while being supported by the bearing 300, and a motor shaft O-ring 500 provided between the motor packing 400 and the bearing 300, wherein the motor shaft O-ring 500 has a through hole 520, which is formed through a central portion of a body part 510 and into which the motor shaft 200 is inserted, projection parts 540 are formed protruding from upper and lower portions of an inner wall surface of the through hole 520 toward the center of the through hole 520 so as to be elastically deformed while outer surfaces of the projection parts 540 come into contact with the outer surface of the motor shaft 200, and a storage groove 530 for storing lubricating oil such as grease is formed between the projection parts 540.

Meanwhile, the motor shaft O-ring 500 has an outer diameter Q1 of the body part 510 in the range of 4.9 to 5.1 mm and a height L of 1.5 mm, the storage groove 530 formed on the inner wall surface of the through hole 520 in the center portion of the body part 510 has a depth l of 0.4 mm, and the projection parts 540 formed on the inner wall surface of the through hole 520 have an inner diameter Q2 of 1.9 mm.

In the present disclosure structured as above, the bearing 300 containing lubricating oil such as grease is installed in the passing hole 110 formed in the housing 100, and the motor shaft O-ring 500 is inserted and installed into the passing hole 110, where the bearing 300 is installed, so that the outer surface of the motor shaft O-ring 500 comes into close contact with the outer surfaces of the projection parts 540.

Herein, since the motor shaft O-ring 500 has the outer diameter Q1 of the body part 510 in the range of 4.9 to 5.1 mm and the height L of 1.5 mm, the motor shaft O-ring 500 is installed such that an upper portion of the body part 510 is drawn out beyond an upper portion of the passing hole 110 and the central portion of the body part 510 is in close contact with the inner wall surface of the passing hole 110.

Meanwhile, the motor shaft 200 inserted through the passing hole 110 is inserted into the through hole 520 formed in the central portion of the body part 510 of the motor shaft O-ring 500.

Herein, since the projection parts 540 formed on the inner wall surface of the through hole 520 have the inner diameter Q2 of 1.9 mm and the storage groove 530 formed between the projection parts 540 has the depth l of 0.4 mm, the outer surface of the motor shaft 200 comes into close contact with the outer surfaces of the projection parts 540 by inserting the motor shaft 200 through the through hole 520 so that the outer surfaces of the projection parts 540 are elastically deformed in the direction of the storage groove 530, wherein the motor shaft 200 is more smoothly inserted through the through hole 520 since lubricating oil such as grease is stored in the storage groove 530.

After installing the motor shaft O-ring 500 in the passing hole 110 formed in the housing 100 as described above, the motor packing 400 having the insertion hole 410, which is formed in the center portion of the motor packing 400 and has the contact protrusions 411 protruding inward at uniform intervals, is installed on the outer surface of the housing 100.

Herein, the outer surface of the motor shaft 200 that is inserted through the insertion hole 410 comes into close contact with the contact protrusions 411, thereby preventing liquid from flowing into the housing 100.

Meanwhile, an outer cover 600, an outer end portion of which is coupled to the housing 100, is installed on an outer portion of the motor packing 400 that is installed on the outer surface of the housing 100.

Therefore, when the motor shaft 200 rotates, waterproofing is primarily achieved by the contact protrusions 411 of the motor packing 400, which come into contact with the outer surface of the motor shaft 200. In addition, when a space is generated between the motor shaft 200 and the contact protrusions 411 and liquid flows in, sequential waterproofing is achieved by contact between the outer surface of the motor shaft 200 and the projection parts 540 formed on the upper and lower portions of the inner wall surface of the through hole 520 of the motor shaft O-ring 500 and, at the same time, the viscosity of lubricating oil such as grease filled in the storage groove 530 formed on the inner wall surface of the through hole. Finally, inflow of liquid into the housing 100 is prevented by the bearing 300 containing lubricating oil such as grease and installed between the inner wall surface of the passing hole 110 and the outer surface of the motor shaft 200. Therefore, the durability of the motor is improved and electrical problems or malfunctions due to inflow of fluid can be prevented.

Although the preferred embodiment of the present disclosure has been described in detail above, the scope of rights of the present disclosure is not limited thereto, and various modifications and improvements made by those skilled in the art using the basic concept of the present disclosure defined in the following claims also fall within the scope of the present disclosure.

What is claimed is:

1. A waterproof motor, comprising:
   a housing having a passing hole formed through the housing;

a motor shaft mounted through the passing hole formed in the housing;

a bearing provided between an outer surface of the motor shaft and an inner wall surface of the passing hole in a state in which lubricating oil is contained;

a motor packing having an insertion hole, which is formed in a center portion of the motor packing and has contact protrusions, which are formed protruding inward at uniform intervals so as to come into contact with the outer surface of the motor shaft that rotates while being supported by the bearing; and a motor shaft O-ring provided between the motor packing and the bearing, wherein the motor shaft O-ring has a through hole, which is formed through a central portion of a body part and into which the motor shaft is inserted, projection parts are formed protruding from upper and lower portions of an inner wall surface of the through hole toward the center of the through hole so as to be elastically deformed while outer surfaces of the projection parts come into contact with the outer surface of the motor shaft, and a storage groove for storing lubricating oil is formed between the projection parts.

2. The waterproof motor according to claim 1, wherein the motor shaft O-ring has an outer diameter of the body part in the range of 4.9 to 5.1 mm and a height of 1.5 mm, the storage groove formed on the inner wall surface of the through hole in the center portion of the body part has a depth of 0.4 mm, and the projection parts formed on the inner wall surface of the through hole have an inner diameter of 1.9 mm.

* * * * *